US008600636B2

(12) United States Patent
Chen et al.

(10) Patent No.: US 8,600,636 B2
(45) Date of Patent: Dec. 3, 2013

(54) METHOD FOR DETERMINING WET CLUTCH TEMPERATURE

(75) Inventors: Gang Chen, Rochester Hills, MI (US); Yimeng Jin, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/445,146

(22) Filed: Apr. 12, 2012

(65) Prior Publication Data

US 2012/0261228 A1 Oct. 18, 2012

Related U.S. Application Data

(60) Provisional application No. 61/474,742, filed on Apr. 12, 2011.

(51) Int. Cl.
*F16D 23/00* (2006.01)
*B60K 6/38* (2007.10)
*B60K 6/383* (2007.10)
*B60K 6/387* (2007.10)
*G06F 7/00* (2006.01)
*G06F 17/00* (2006.01)
*G06F 19/00* (2011.01)

(52) U.S. Cl.
USPC .......... 701/67; 701/51; 701/52; 701/61; 701/95; 192/82 T; 192/99 A; 192/99 B; 192/104 F; 192/106 F; 192/200

(58) Field of Classification Search
CPC .......... B60K 6/38; B60K 6/383; B60K 6/387; B60K 17/35; B60K 17/351; B60K 17/3515; B60K 23/02

USPC ........ 192/82 T, 99 A, 99 B, 104 F, 106 F, 200
See application file for complete search history.

(56) References Cited

U.S. PATENT DOCUMENTS

| 5,723,779 | A | | 3/1998 | Hara et al. |
| 5,823,912 | A | * | 10/1998 | Fischer et al. .................. 477/97 |
| 2003/0045987 | A1 | * | 3/2003 | Gochenour ..................... 701/51 |
| 2003/0150685 | A1 | * | 8/2003 | Iida et al. ..................... 192/82 T |

(Continued)

FOREIGN PATENT DOCUMENTS

| DE | 10131434 A1 | 1/2003 |
| DE | 102005033077 A1 | 3/2006 |

(Continued)

OTHER PUBLICATIONS

Gang Chen, Kevin Baldwin & Edward Czarnecki, Real Time Virtual Temperature Sensor for Transmission Clutches, SAE International, Apr. 12, 2011.

*Primary Examiner* — Mary Cheung
*Assistant Examiner* — Atul Trivedi
(74) *Attorney, Agent, or Firm* — Frederick A. Krieger (57) ABSTRACT

A method for determining clutch temperature. The method provides an accurate real-time clutch temperature that can be used to improve shift quality and protect against failure due to clutch overheating. A counter is incremented every time the clutch exceeds a threshold temperature to track cumulative high temperature conditions. Determining the clutch temperatures includes taking account of heat generation, clutch cooling by transmission oil flow from a groove when the clutch is engaged, clutch cooling by open transmission oil flow when the clutch is disengaged, oil vaporization, and heat conduction.

19 Claims, 4 Drawing Sheets

(56) References Cited

U.S. PATENT DOCUMENTS

| | | |
|---|---|---|
| 2005/0071065 A1* | 3/2005 | Zimmermann et al. ........ 701/51 |
| 2005/0177294 A1* | 8/2005 | Jiang et al. .................... 701/67 |
| 2005/0177295 A1* | 8/2005 | Rodrigues et al. ............. 701/67 |
| 2005/0283298 A1* | 12/2005 | Ochi et al. ..................... 701/67 |
| 2008/0147288 A1* | 6/2008 | Reiher et al. ................... 701/84 |
| 2010/0057318 A1* | 3/2010 | Nedachi et al. ................ 701/68 |
| 2010/0075804 A1* | 3/2010 | Ryberg et al. ................ 477/174 |
| 2010/0200357 A1 | 8/2010 | Okabe et al. |
| 2011/0029207 A1 | 2/2011 | Sasahara et al. |

FOREIGN PATENT DOCUMENTS

| | | |
|---|---|---|
| DE | 102007053706 A1 | 5/2009 |
| EP | 1482196 A1 | 12/2004 |
| EP | 1914435 A1 | 4/2008 |
| FR | 2878619 A1 | 6/2006 |
| FR | 2936034 A1 * | 3/2010 |

* cited by examiner

METHOD FOR DETERMINING WET CLUTCH TEMPERATURE

RELATED APPLICATIONS

The present application claims priority to provisional application 61/474,742 filed Apr. 12, 2011, which is hereby incorporated by reference in its entirety.

FIELD

The invention relates to methods and systems for determining real-time temperatures of the wet clutches in an automatic transmission.

BACKGROUND

Automatic transmissions have long employed hydraulically-applied clutches to effect ratio changes in planetary gear trains, for example, through the synchronized opening and closing of select clutches attached to different elements of the planetary systems. The clutch assembly used in automatic transmissions typically consists of multiple separators, friction plates and other components. The friction plate is made of a low carbon steel core plate with friction material bonded on each side, which is splined to the input shaft while the separator plates are lugged to the clutch housing or vice versa. The clutch housing could link to another shaft (rotating clutches) or to the transmission case (brake clutches).

Due to their desirable friction characteristics for shift quality and cost effectiveness, wet paper-based friction materials have been primarily used as clutch facings for automatic transmissions in cars and brake materials for industrial vehicles. However, because of the lack of heat and chemical stability under extremely high temperature conditions, the paper-based cellulose fiber often breaks down causing material break out, high-friction-lining thickness loss and, eventually, loss of appropriate friction characteristics. Indeed, it is believed that thermal degradation of the friction material due to high temperature is the major factor for determining the life cycle of a wet clutch.

After the friction material is thermally degraded to a certain extent, the friction characteristics will be changed dramatically and the performance of the friction material will suffer. Generally, the least heat-resistant composition in the friction material will be degraded first at elevated temperatures. By way of example only, in an exemplary wet friction clutch, a first rapid decline occurs at about 380° C. and corresponds to the rate of cellulose degradation. A second rapid decrease occurs at about 550° C. and corresponds to that of inert contents. For instance, some cellulose fibers start to carbonize near 200° C. and finish the degradation at about 420° C. under the Thermal Gravimetric Analysis (TGA) test condition.

The damage that occurs in a friction system from the temperature induced by high-energy shifts is cumulative. Each excursion to high temperatures activates the damage mechanism and adds damage to that already done. By reducing the peak interface temperatures and by reducing the time above the activation temperature, the damage to the friction material is reduced and the useful life of the friction system can be increased.

In addition to causing clutch failure, high clutch temperature also influences shift quality. It is well known that excellent shift quality depends on accurate clutch torque execution during a shift. Typically, clutch torque is a linear function of clutch friction coefficient (COF), which is a strong, nearly-linear function of temperature. Again, by way of example only, the COF of an exemplary clutch might vary 20-30% over a one-hundred degree temperature change. Thus, it will be appreciated that, without temperature compensation, shift quality is very difficult to maintain.

SUMMARY

The present disclosure provides a new method for determining wet clutch temperature and applications of the method to improve shift quality, prevent failures, and diagnose potential issues.

During engagement, the separator plates and friction plates are forced together by pressure, and the kinetic energy of relative slip speed is converted to heat at the interfaces. With each shift, the clutch system absorbs energy generated by the slipping of the clutch during the engagement and is then removed from the friction system by the oil and heat conduction through the separator spline teeth. Thus, there are three elements to the friction system energy balance: energy-in, energy-stored, and energy-out.

Energy-in occurs primarily during the engagement of the applying clutch for a power-on upshift and during disengagement of releasing clutch for a power-on downshift. The total energy of the shift is the integrated product of the slip speed and the clutch torque over time. The energy input rate (power) during a shift is typically very high relative to the energy removal rate. As a result, the temperature of separator and friction plates increases during a shift.

Energy is removed from the friction system primarily by the oil that flows past the separators and by conduction to the hub and housings through the spline teeth. While the clutch is not applied, there is cooling oil flowing to the clutch. If the clutch is rotating as an assembly while applied, cooling flow is being centrifugally forced through the grooves in the friction facings, carrying heat away from the hot surfaces. In the case of a grounded clutch, the oil feed is not being centrifugally driven through the grooves and a high percentage of the heat will be removed by conduction through the spline teeth.

The temperature rise at the interface during engagement is determined by the input energy, the heat dissipation rate through the separators and the heat removal rate of the transmission oil. The temperature history near the friction interface is important since it determines the performance characteristics, and especially, the thermal degradation rate of the friction material.

By design, clutch thermal durability should not be an issue if the clutch will not be subjected to high-energy shifts that are closely-spaced in time. However, closely-spaced shifts will cause the temperature to ratchet up if the time between shifts is insufficient to return the friction system to sump oil temperature. Even though the energy input for a single shift can be calculated from estimated clutch torque and slip speeds, the cooling effect during and after clutch engagement/disengagement is time-dependent and very difficult to estimate. Typical linear or non-linear look-up tables and predefined constant temperature decay rates can not be used to estimate the real clutch temperature because clutch temperature is an integrated result of input energy and cooling heat transfer.

In accordance with an aspect of the invention, a method for determining a real-time clutch temperature for in-vehicle applications includes determining a clutch temperature cooling rate based on oil-flow convection to the clutch, calculated, for example, as a function of clutch rotating speed and heat conduction from the clutch to the transmission case calculated. By way of example only, in an exemplary method, clutch temperature is estimated based on a clutch pressure prediction, without requiring a temperature sensor with which to directly detect real-time clutch temperature.

In accordance with another aspect of the invention, the physical model for an exemplary method includes the heat generation, clutch cooling by transmission oil flow both from groove when the clutch is engaged and open clutch oil flow when the clutch is disengaged, oil vaporization and heat conduction.

The exemplary method for determining clutch temperature in accordance with the invention can be advantageously used as a tool to reduce validation testing and to optimize existing or proposed designs. The exemplary method can also be used to compensate for the friction coefficient variations in real time shift control and modify shift scheduling for clutch overheat protection. In addition, the exemplary method provides valuable information for clutch life estimation, customer driving habits identification, and root cause investigation for clutch failures and design improvement. The exemplary method can also be used as an engineering assistant tool for transmission control strategy development and shift quality calibration.

The exemplary method is advantageously used as a virtual sensor to protect clutch failure from overheating, to thereby beneficially reduce transmission warranty costs and improve shift quality through clutch temperature compensation, without increasing production costs.

By virtue of its focus on several identified clutch operating phenomena, such as heat conduction and heat convection due to oil flow both in an open clutch and in grooves, and oil vaporization, the exemplary method is provides a virtual temperature sensor for transmission clutches which employs a clutch temperature model of manageable size and computational time for real-time transmission control applications.

In one form, the present disclosure provides a method of measuring and preventing clutch overheating comprising calculating a clutch temperature as a function of at least clutch pressure, incrementing a counter within a vehicle control system each time the clutch temperature exceeds a first predetermined temperature value, and taking corrective action based on a value of the counter. The method can also include recording in the vehicle control system the total time the clutch is maintained at a temperature above a second predetermined temperature value, which may or may not be different from the first predetermined temperature value. The method can also include recording the change in temperature for at least the most recent shift. This information can be used to evaluate shift quality, shift logistics, and possible hardware failure. Clutch pressure can be calculated or measured. The method may also include predicting a temperature increase for a requested shift prior to executing the requested shift.

The corrective actions can involve displaying information on a vehicle display, actively changing control parameters, and providing diagnostic information. For instance, taking corrective action can involve providing information to an operator via a vehicle display. This information can include one or more of a shift quality indicator, a clutch temperature warning, a clutch lifecycle indicator, and a clutch overheat protection indicator. By further example, corrective action can also involve providing real-time compensation within the vehicle control system, such as, modifying shift schedules, modifying shift logic, or providing overheat protection. Each of these corrective actions may be based on one or both of clutch temperature and the predicted increase in clutch temperature for the requested shift. Real-time compensation can also include providing clutch overheat protection based on clutch temperature such that clutch overheat protection is provided only if the clutch temperature is above a threshold value.

Calculating the clutch temperature can be based on one or more of heat generation, clutch cooling by transmission oil flow from a groove when the clutch is engaged, clutch cooling by open transmission oil flow when the clutch is disengaged, oil vaporization, and heat conduction. Calculating the clutch temperature can also be based on the assumption that during contact the clutch temperature, a separator plate temperature and a friction lining temperature are substantially equal and that heat transfer is proportional to physical material properties. The method can also include predicting a failure of the clutch based on the value of the counter, diagnosing root causes of clutch failures based on the value of the counter, and determining at least one of shift quality and driver habits based on the value of the counter. Any of these actions, or other corrective actions, can also be based on the total time the clutch is maintained at a temperature above a second predetermined temperature value, the change in temperature for at least the most recent shift or any combination thereof.

Corrective action can be based on the value of the counter such as taking corrective action when the counter reaches predetermined value. Corrective action can also be based on a combination of the counter and the total time the clutch is maintained at a temperature above a second predetermined temperature value.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
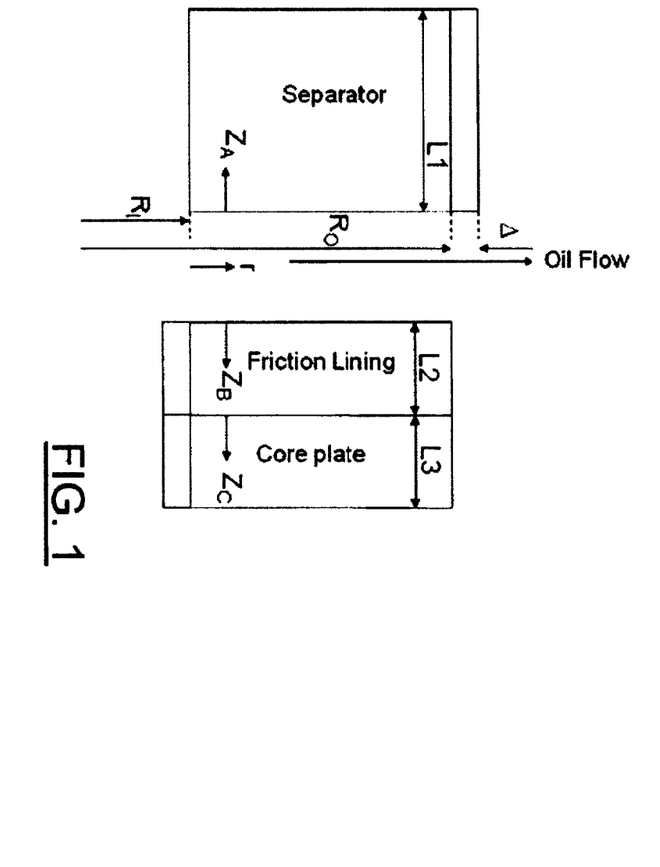
FIG. 1 is a schematic illustration of the separator and friction plates of a wet clutch.

Referring to the schematic illustration of the separator and friction plates of a wet clutch as shown in FIG. 1, the transient conduction for two dimensional heat transfer using cylindrical coordinates is expressed as $$\frac{\partial T}{\partial t} - \frac{k}{\rho C}\left[\frac{1}{r}\frac{\partial}{\partial r}\left(r\frac{\partial T}{\partial r}\right) + \frac{\partial^2 T}{\partial Z^2}\right] = 0$$

Based upon empirical studies, the temperature inside the separator plate can be considered as being close to uniform after one second due to high thermal conductivity. To simplify implementation for real-time application in a transmission controller, an exemplary method of lumped-separate plate with two dimensional boundary conditions was applied:

$$2\pi \int_0^{L1} \int_{R_I}^{R_O} \frac{\partial T}{\partial t} r\, dr\, dZ -$$

$$\frac{k}{\rho C} 2\pi \left[ \int_0^{L1} \left( r \frac{\partial T}{\partial r} \right) \bigg|_{R_I}^{R_O} dZ + \int_{R_I}^{R_O} \frac{\partial T}{\partial Z} \bigg|_0^{L1} r\, dr \right] = 0$$

Boundary conditions,

At $Z_A = L1$ $\frac{\partial T}{\partial Z} = 0$

At $Z_A = 0$ $Q + k_A \frac{\partial T_A}{\partial Z_A} + k_B \frac{\partial T_B}{\partial r_B} - h(T_A - T_{mo}) = 0$ At $Z_B = 0$ $Q + k_A \frac{\partial T_A}{\partial Z_A} + k_B \frac{\partial T_B}{\partial r_B} - h(T_B - T_{mo}) = 0$ At $Z_B = L2$ $k_B \frac{\partial T}{\partial Z} = k_C \frac{\partial T}{\partial Z}$ At $Z_C = L3$ $\frac{\partial T}{\partial Z} = 0$ At $r = R_I$ $k_A \frac{\partial T}{\partial r} = h_I(T_A - T_I)$ At $r = R_O$ $-k_A \frac{\partial T}{\partial r} = h_O(T_A - T_O)$ There are a number of ways to characterize the difference between the plate and oil temperature. Choosing a method requires a balance between the need for increased accuracy and need for a simple calculation that can be executed quickly for real time simulations. The Log Mean Temperature Difference (LMTD), shown below, is one way to characterize the difference between the plate and oil temperature, although other methods, such as a simple arithmetic mean calculation, can be used without departing from the invention.

$T_{mo} = T_A - \text{LMTD}$ where the LMTD is itself defined as $$\text{LMTD} = \frac{T_O - T_I}{\ln \frac{T_A - T_I}{T_A - T_O}}$$

Another boundary condition is the contact temperature between the separator plate and friction lining material during and after engagement. At the end of cooling stage, the friction lining material and separator plate faces are at different temperatures. However, at the initiation of the engagement stage, both faces are merged into one, and the friction lining material and separator plate faces must have identical temperatures. This becomes a contact temperature problem for which the solution is $$T_m = \frac{T_A \sqrt{k_A \rho_A C_A} + T_B \sqrt{k_B \rho_B C_B}}{\sqrt{k_A \rho_A C_A} + \sqrt{k_B \rho_B C_B}}$$

The ratio of $\sqrt{k_A \rho_A C_A} / \sqrt{k_B \rho_B C_B}$ is typically greater than 10, which means that $T_m$ is much closer to the separator plate face temperature.

During the engagement stage, the energy input rate (power) during a shift is typically much higher relative to the energy removal rate. As a result, contact temperature rises rapidly as heat transfers into both sides of the separator plate and friction lining material. Based on the analytical solution of heat transfer in the semi-infinite solid, the ratio of heat absorbed by the separator plate and friction lining material can be expressed as $$\frac{Q_B}{Q_A} = \frac{T_m - T_B}{T_m - T_A} \frac{\sqrt{k_B \rho_B C_B}}{\sqrt{k_A \rho_A C_A}}$$

If the difference between $T_m - T_B$ and $T_m - T_A$ is small enough, the above equation can be further simplified to $$Q_B = \frac{\sqrt{k_B \rho_B C_B}}{\sqrt{k_A \rho_A C_A}} Q_A$$

It is reasonable to assume that the difference between $T_m - T_B$ and $T_m - T_A$ is relatively small because the contact temperature $T_m$ is an equilibrium point to which the Separator temperature $T_B$ and the Friction Lining temperature $T_A$ converge when they are brought into contact with one another. By assuming that the difference between $T_m - T_B$ and $T_m - T_A$ is relatively small, the following simplification is possible.

Applying this equation as a boundary condition, the whole clutch temperature model is simplified by only solving for separator plate heat transfer without involving the heat transfer to the friction lining material and the core plate, thereby avoiding the complexity of considering the effect of compressibility and liquid permeability of the friction materials. This simplification provides an accurate model for clutch temperature that is simple enough to be calculated in nearly real-time to provide useful control information.

During the engagement mode, the clutch slips for approximately one second then locks and rotates as one unit. Heat generation occurring during engagement-mode slipping is defined as $$q_s = \frac{dQ}{dA dt} = r \mu P_c \omega_s$$

In order to calculate the heat generation of the clutch, the clutch pressure needs to be estimated or measured. The following example shows an exemplary PWM-solenoid transmission control system, in which there is a relationship between the accumulator pressure and the fluid volume. It is also possible to measure the clutch pressure either directly or indirectly with a sensor as opposed to using a mathematical estimation. Furthermore in systems utilizing variable force solenoids (VFS) the pressure can be calculated based on the current or duty cycle of the solenoid. Oil filling the accumulator must compress a spring whose volume varies over the usable range, of the calculated element pressure. For any clutch, the total volume of the clutch is the sum of the clutch fill volume and the accumulator fill volume $V = V_f + A_a X_a$ And the accumulator pressure will be $$P_a = P_{pre} + \frac{K_a X_a}{A_a}$$

Solving for $X_a$ and substituting into the above equation for accumulator pressure gives the following equation:

$$P_a = P_{pre} + \frac{K_a(V - V_f)}{A_a^2}$$

The relationship between the accumulator pressure and clutch pressure is $$P_c = P_{pre} + \frac{P_a(R_{op}^2 - R_{ip}^2)}{(R_O^2 - R_I^2)}$$

Figure 2:
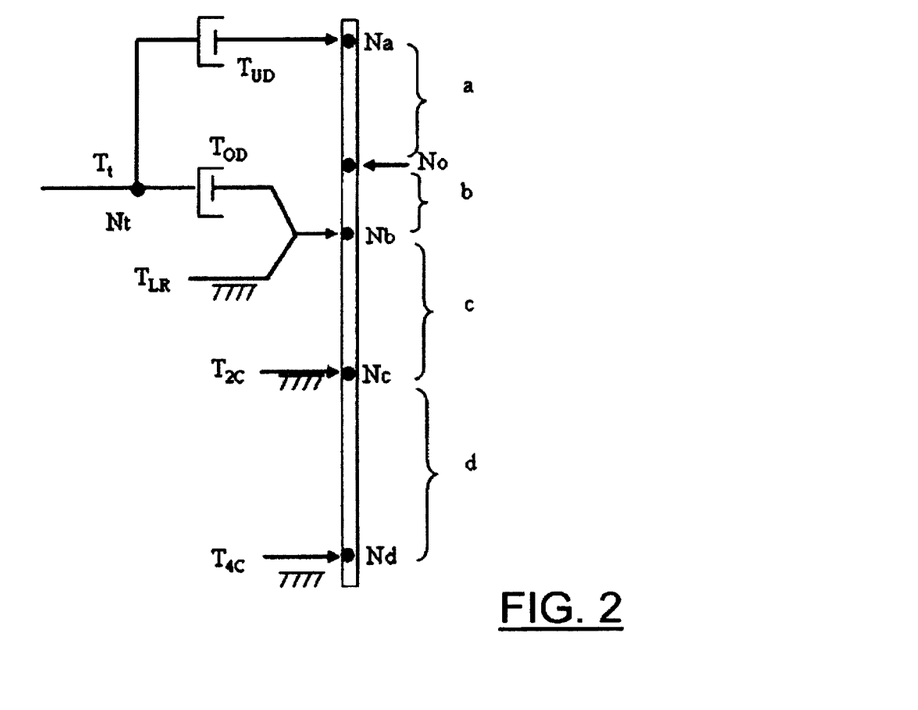
FIG. 2 is a lever diagram for the wet clutch illustrated in FIG. 1.

The clutch slip speed can be determined from the lever analogy as shown in FIG. 2. Every node on the lever can be determined as a function of both the input speed $N_i$ and output speed $N_o$.

Figure 3:
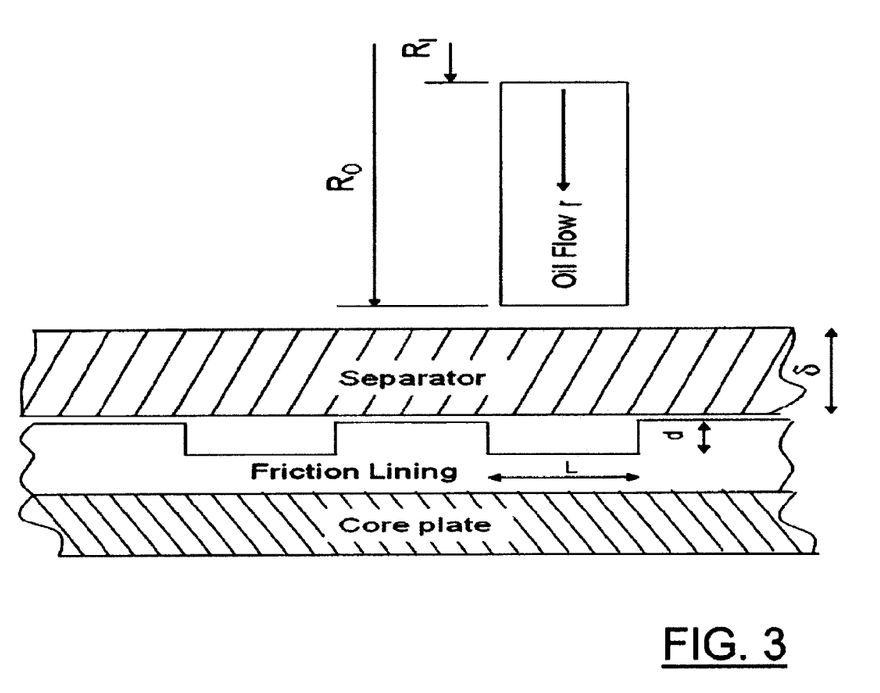
FIG. 3 is a partial schematic of a wet clutch showing oil flow through grooves formed in the friction plate lining.

Oil flow through the groove is shown in FIG. 3. One way to describe the oil flow through the groove is shown below. It is also possible to use other empirical methods or different mathematical models to account for the oil flow through the groove.

$$\Delta P - \frac{R_O - R_I}{2} \rho V_o^2 \frac{f}{D_h} = 0$$

The following formula is used to evaluate the heat transfer coefficient between the oil flow in the groove and the clutch interface.

$$Nu = b_0 Re^{b_1} Pr^{b_2} 10^{b_3 Re^{b_4}}$$

The oil flow in the disengaged clutches can be written as $$\frac{\partial p}{\partial r} = -\frac{\mu}{\delta^2 G_r} V_{rm} + \rho r \omega^2 \left(f + \frac{1}{4}\right)$$

From this equation, it will be appreciated that the oil flow rate increases with the clutch rotating speed. However, because the oil flow rate through the clutch is typically limited by design, when the flow rate limit is reached, the oil flow crossing area in the radial direction must shrink with further increased clutch rotating speed by the law of mass conservation.

One example for calculating the heat transfer coefficient between the oil flow and the clutch interface when clutches are disengaged is shown below. Other techniques can also be used to find this value.

$$Nu = a_0 Re^{a_1} Pr^{a_2} \left(\frac{D_h}{R_O - R_I}\right)^{a_3} \left(\frac{\mu}{\mu_w}\right)^{a_4}$$

In some extreme cases, the clutch peak temperature could be over 200° C. and even beyond 260° C. For those cases, the oil vaporization effect as a heat sink is considered since the transmission oil vapor pressure could be up to 5 and 18 kilopascal for MS-9602 ATF.

The transmission oil vaporization rate at clutch surface is equal to $$m_v = \frac{h_o}{C_o} \ln \frac{1 + Y_{so}}{1 - Y_{so}}$$

where $Y_{so}$ is the mass fraction of fuel vapor at oil surface and is equal to $$Y_{so} = \frac{P_o W_{mo}}{P_a W_{ma}}$$

Figure 4:
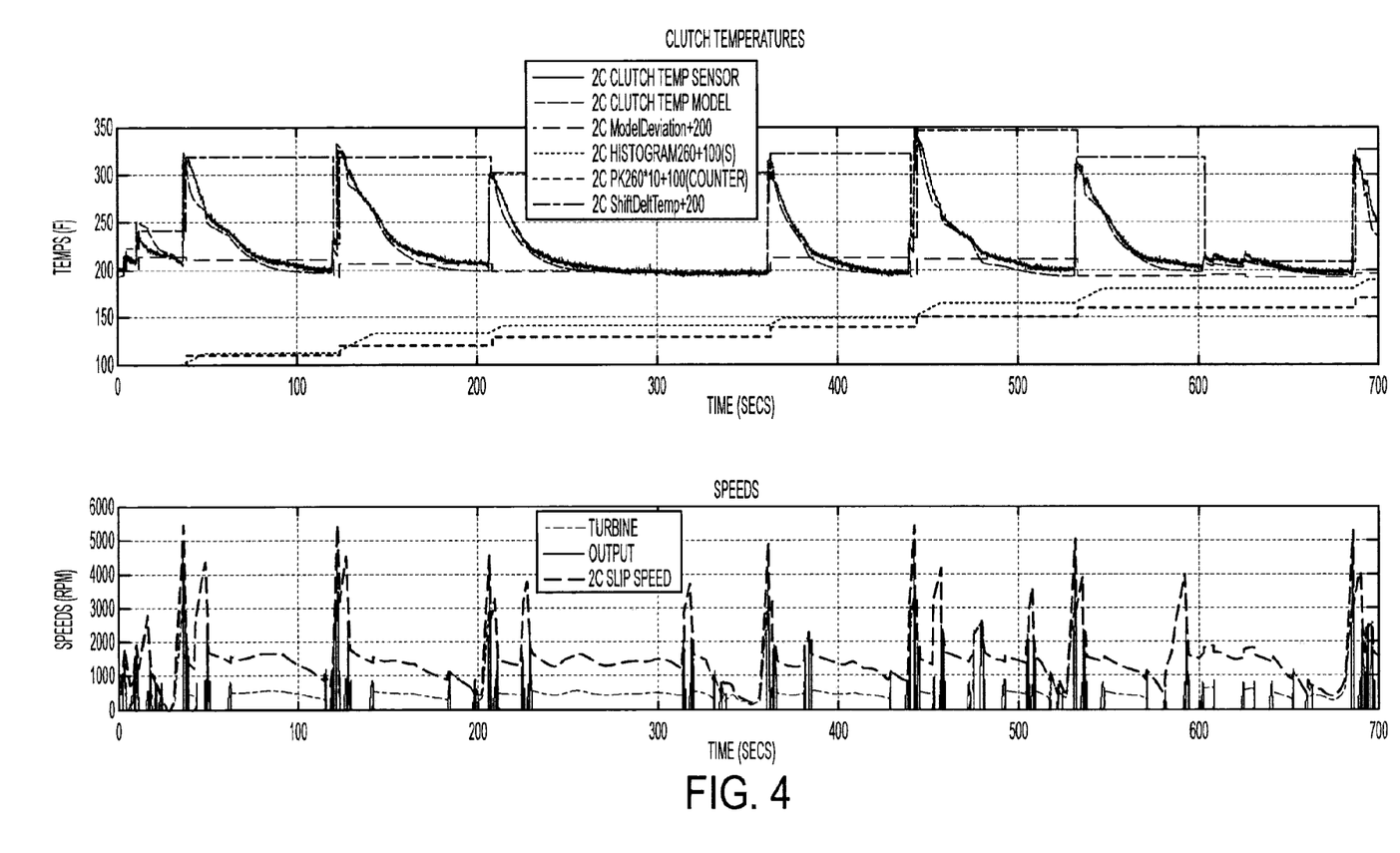
FIG. 4 is a plot of sensed clutch temperatures versus determined clutch temperature using the exemplary method, for a test vehicle equipped with a wet-clutch automatic transmission.

FIG. 4 is an illustrative plot of both sensed in-vehicle real-time temperature data (solid line) and values for determined wet clutch temperature generated using the exemplary method (dotted line), as well as a further plot of clutch peak temperature deviation between the sensor data and the determined values (dashed line). The overall difference is within plus and minus 10° F.

FIG. 4 further includes a plot of delta clutch temperature increase for a single shift (phantom line), which is useful for transmission control strategy evaluation and calibration and, particularly, to evaluate shift quality. A higher temperature rise for the shifts with the same input torque and speed typically indicates that the shifts are not optimized or there are some hardware issues. The clutch peak temperature counter, shown as the purple line, provides valuable data with respect to clutch life. It can also be used to identify customer driving patterns for the root cause analysis in case of clutch failures in the field. Even with the same clutch peak temperature, the duration of clutch temperature above certain point could be significantly different from each other. The clutch temperature histogram, shown as the light blue line, is the time integration of the clutch exposed to the temperatures above certain limits, which will reveal information from different prospective to estimate clutch life. This information may also be used for future hardware and control strategy design optimizations.

Because clutch COF is almost a linear function of the interface temperature, with perhaps a 20-30% variation in COF for a one-hundred degree temperature change, it will be appreciated that an accurate clutch temperature prediction can provide a good foundation to ensure excellent shift quality.

Finally, the clutch temperature calculation can be used for real-time clutch overheat protection. Without accurate clutch temperature prediction, overheat protection could unnecessarily deteriorate the drivability and under protection would potentially cause clutch failure or reduced clutch life. Because road conditions, vehicle loads and customer driving patterns are unpredictable, the most effective protection to clutch overheat in the field is real-time driving strategy modification, for example, using determined real-time clutch temperatures in accordance with the exemplary method.

Figure 5:
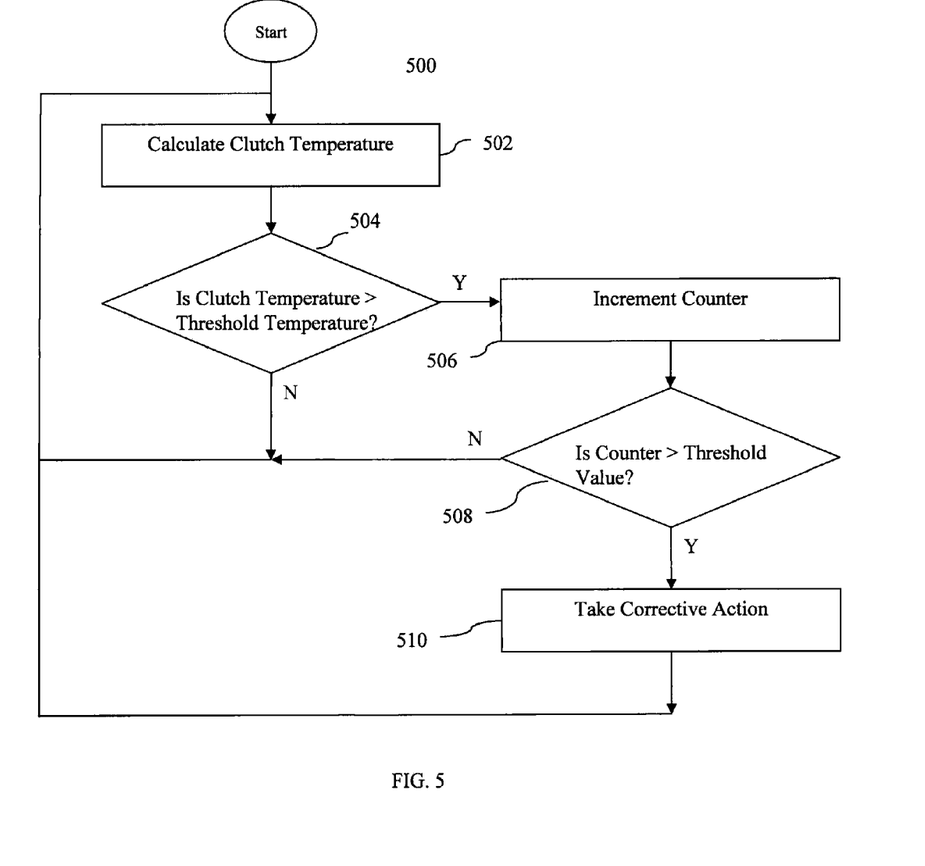
FIG. 5 is a flowchart illustrating a method in accordance with the present disclosure.

FIG. 5 shows a method according to the current disclosure. First, the clutch temperature is calculated at 502. Next, at 504, the method determines if the clutch temperature is greater than a predetermined threshold temperature. If the clutch temperature is not greater than the predetermined threshold temperature then the method restarts at step 502. If the clutch temperature is greater than a predetermined threshold temperature then the method continues to step 506 where a counter is incremented. Then the value of the counter is compared to a threshold value at 508. If the counter is not greater than the predetermined threshold value the method restarts at step 502. If the counter is greater than the predetermined threshold value then the method continues to step 510 where corrective action is commenced. The entire process is iterative and runs continuously during operation such that even when corrective action is taken at 510 the method returns to step 502 to continue calculating the clutch temperature.

DEFINITIONS/ABBREVIATIONS

The following items indicate the meaning of certain variables and abbreviations utilized in the equations and Figures associated with the present disclosure.
A clutch surface area
$A_a$ accumulator area
$a_0, a_1, a_2, a_3, a_4$ constants for heat transfer coefficient between oil flow in open clutch and clutch interface
$b_0, b_1, b_2, b_3, b_4$ constants for heat transfer coefficient between oil flow in the groove and the clutch interface
C specific heat
COF coefficient of friction
$D_h$ hydraulic diameter
E activation energy of reaction
f surface friction factor
$G_r$ turbulence coefficient
h heat transfer coefficient
k thermal conductivity,
$K_a$ accumulator spring rate
LMTD log mean temperature difference
m oil flow rate
N rotating speed
P pressure
$P_a$ atmospheric pressure
$P_c$ clutch pressure
$P_o$ oil vapor partial pressure at the oil film surface
$P_{pre}$ accumulator Preload Pressure
$P_{ret}$ clutch return spring
r radius
R Boltzmann constant
$R_I$ friction disc inner radius
$R_{IP}$ clutch piston inner radius
$R_O$ friction disc outer radius
$R_{OP}$ clutch piston outer radius
t time,
T temperature in K
$T_I$ oil flow inlet temperature
$T_O$ oil flow outlet temperature
$T_m$ contact temperature
$T_{mo}$ mean oil temperature on the clutch surface
TGA thermal gravimetric analysis
V total oil volume
$V_f$ fill Volume
$V_o$ oil flow velocity
W friction material weight remaining,
$W_{mo}$ molecular weight of oil
$W_{mo}$ molecular weight of air
$W_o$ friction material original weight
$X_a$ accumulator Displacement
$Y_{so}$ oil vapor mass fraction at oil film surface
δ clutch clearance $$\theta = \theta_o e^{-\frac{E}{RT}}$$

reaction rate
$\theta_o$ reaction rate constant,
ρ density,
μ viscosity
$\omega_s$ clutch slip speed
ΔP equivalent differential pressure for the centrifugal effort $$Ro = \frac{\varpi D_h}{V_o}$$

velocity constant $$Nu = \frac{hL}{k}$$

Nusselt number $$Pr = \frac{\mu c_p}{k}$$

Prandtl number $$Re = \frac{VL\rho}{\mu}$$

Reynolds number

What is claimed is:

1. A method of measuring and preventing clutch overheating, said method comprising:
    calculating a clutch temperature as a function of at least clutch pressure;
    incrementing a counter within a vehicle control system based on a determination that the clutch temperature exceeds a first predetermined temperature value; and
    taking corrective action based on a value of the counter.

2. The method of claim 1, further comprising:
    recording in the vehicle control system the total time the clutch is maintained at a temperature above a second predetermined temperature value.

3. The method of claim 2, wherein the first predetermined temperature value is equal to the second predetermined temperature value.

4. The method of claim 2, wherein the act of taking corrective action includes taking corrective action based on the value of the counter and on the total time the clutch is maintained at a temperature above a second predetermined temperature value.

5. The method of claim 2, further comprising:
    predicting a failure of the clutch based on at least one of the value of the counter and the total time the clutch is maintained at a temperature above the second predetermined temperature value.

6. The method of claim 2, further comprising:
    diagnosing root causes of clutch failures based on at least one of the value of the counter and the total time the clutch is maintained at a temperature above the second predetermined temperature value.

7. The method of claim 2, further comprising:
determining at least one of shift quality and driver habits based on at least one of the value of the counter, the total time the clutch is maintained at a temperature above the second predetermined temperature value, and a change in temperature for at least the most recent shift.

8. The method of claim 1 further comprising:
predicting a temperature increase for a requested shift prior to executing the requested shift.

9. The method of claim 8, wherein taking corrective action involves providing real-time compensation within the vehicle control system.

10. The method of claim 9, wherein the real-time compensation includes modifying shift schedules based on at least one of clutch temperature and the predicted increase in clutch temperature for the requested shift.

11. The method of claim 9, wherein the real-time compensation includes modifying shift logic based on at least one of clutch temperature and the predicted increase in clutch temperature for the requested shift.

12. The method of claim 9, wherein the real-time compensation includes providing clutch overheat protection based on at least one of clutch temperature and the predicted increase in clutch temperature for the requested shift.

13. The method of claim 12, wherein the real-time compensation includes enabling clutch overheat protection only if the clutch temperature is above a threshold value.

14. The method of claim 1, wherein taking corrective action involves providing information via a vehicle display.

15. The method of claim 14, wherein the information provided to the vehicle display includes at least one of a shift quality indicator, a clutch temperature warning, a clutch lifecycle indicator, and a clutch overheat protection indicator.

16. The method of claim 1, further comprising recording the change in temperature for at least the most recent shift.

17. The method of claim 1, wherein calculating the clutch temperature is based on at least one of heat generation, clutch cooling by transmission oil flow from a groove when the clutch is engaged, clutch cooling by open transmission oil flow when the clutch is disengaged, oil vaporization, and heat conduction.

18. The method of claim 1, wherein calculating the clutch temperature is based on the assumption that during contact the clutch temperature, a separator plate temperature and a friction lining temperature are substantially equal and that heat transfer is proportional to physical material properties.

19. The method of claim 1, wherein taking corrective action based on the counter includes taking corrective action when the counter reaches predetermined value.

* * * * *